United States Patent [19]

Giacomel

[11] Patent Number: 4,774,702
[45] Date of Patent: Sep. 27, 1988

[54] ERASABLE OPTICAL MEMORY EMPLOYING A MARMEN ALLOY TO EFFECT PHASE-CHANGE ERASING IN A CHALCOGENIDE FILM

[75] Inventor: Jeffrey A. Giacomel, Arlington, Tex.

[73] Assignee: LTV Aerospace and Defense Company, Dallas, Tex.

[21] Appl. No.: 75,224

[22] Filed: Jul. 17, 1987

Related U.S. Application Data

[63] Continuation of Ser. No. 847,992, Apr. 3, 1986, abandoned.

[51] Int. Cl.$^4$ ............................ G11B 7/00; G11B 7/22
[52] U.S. Cl. ................................... 369/100; 369/284; 369/286; 365/113; 365/114; 365/127; 346/137
[58] Field of Search ................. 369/100, 125, 13, 284, 369/286; 365/124, 127, 113, 114, 122; 430/19; 346/135.1, 137

[56] References Cited

U.S. PATENT DOCUMENTS

| | | | |
|---|---|---|---|
| 4,236,156 | 11/1980 | Eden | 340/786 |
| 4,285,056 | 8/1981 | Bell | 369/286 X |
| 4,371,954 | 2/1983 | Cornet | 369/100 X |
| 4,398,203 | 8/1983 | Cornet | 369/100 X |
| 4,404,656 | 9/1983 | Cornet | 369/100 X |
| 4,527,173 | 7/1985 | Gupta et al. | 365/124 X |
| 4,577,291 | 3/1986 | Cornet | 365/275 X |
| 4,586,164 | 4/1986 | Eden | 365/127 |
| 4,587,533 | 5/1986 | Nakane et al. | 369/275 X |
| 4,637,008 | 1/1987 | Eden | 365/113 X |

FOREIGN PATENT DOCUMENTS 1486271  9/1977  United Kingdom ................ 365/113

OTHER PUBLICATIONS

"Reversible Recording of Holograms in Glassy Chalcogenide Semiconductors in Elevated Temperatures"; Kaincitouskii et al., 800.J. Quant. Electron, vol. 6, No. 1, Jan. 1976, p. 121+.

"Injection Laser Writing on Chalcogenide Films"; Smith, Applied Optics, vol. 13, No. 4, Apr. 1974, pp. 795–798.

*Primary Examiner*—Aristotelis M. Psitos
*Attorney, Agent, or Firm*—Arnold, White & Durkee

[57] ABSTRACT

A portion of a chalcogenide transformation film in a less reflective phase responds to a low energy laser beam writing pulse by transforming to a crystalline phase. A marmem alloy, secured to the bottom side of the film, responds to a longer erasing pulse of a lower energy laser beam at the same portion by physically stressing the film only at that same portion. The film portion responds to the physical stress by transforming back to a less reflective phase. An optical reader interprets the crystalline phase as a digital logic "1", and the less reflective phase as a digital logic "0".

24 Claims, 2 Drawing Sheets

PHASES AFTER WRITING PULSES

PHASES AFTER WRITING PULSES

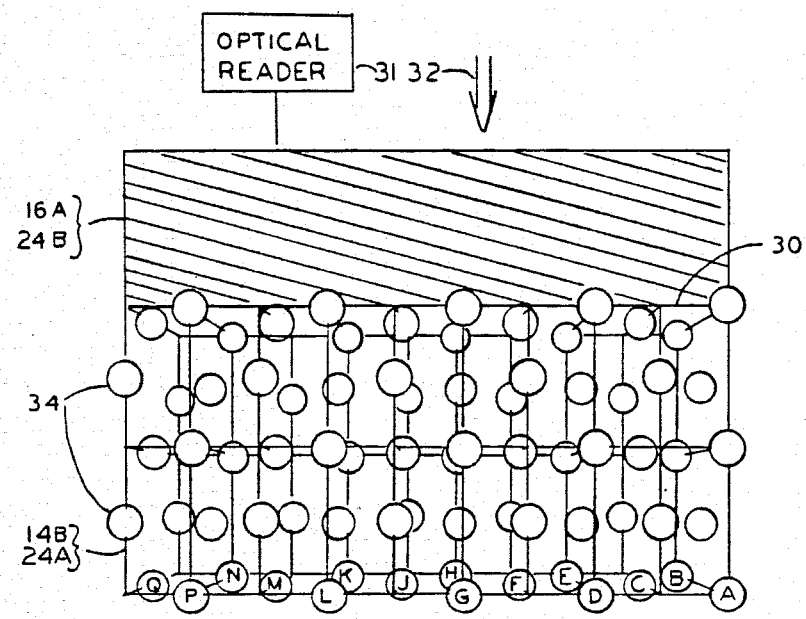
PHASES IMMEDIATELY AFTER ERASING PULSE     FIG. 3
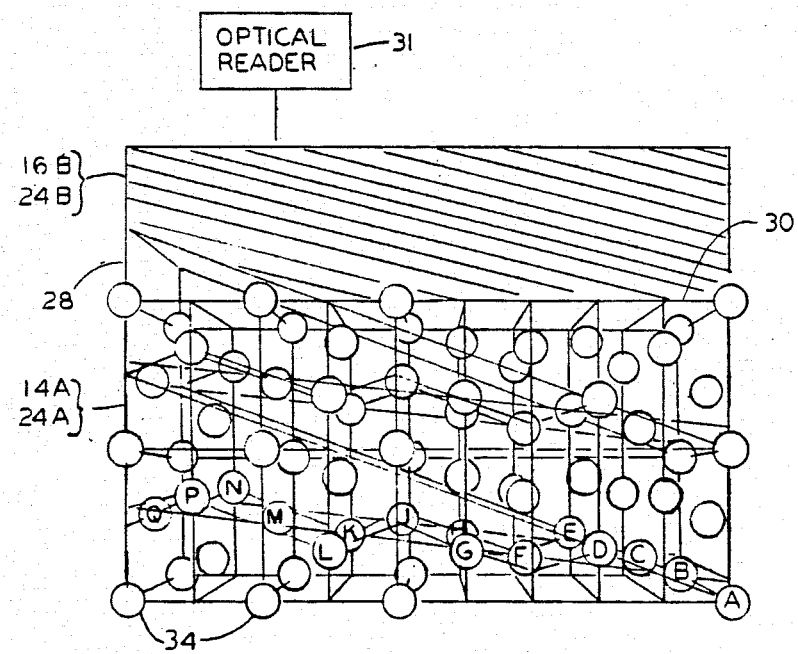
PHASES SHORTLY AFTER ERASING PULSE     FIG. 4

ERASABLE OPTICAL MEMORY EMPLOYING A MARMEN ALLOY TO EFFECT PHASE-CHANGE ERASING IN A CHALCOGENIDE FILM

This is a continuation application of co-pending application Ser. No. 847,992, filed on Apr. 3, 1986, now abandoned.

BACKGROUND OF THE INVENTION

1. Field of the Invention

The present invention relates in general to erasable optical memories. It relates more particularly to the inscription of data into, and the reading or erasing of such data from, a layer of such a memory.

2. Description of the Related Art

One widely used form of an optical memory is the optical disk. Optical disks are made from a disk of a rigid and generally transparent material which sandwiches a thin film of a light-reactive material. The disk rotates at a relatively high speed and passes in front of a reading head which detects the data which has been recorded in the surface layer. For some optical disks, the data is stored in the form of perforations in the surface layer. An optical reader reads the data by passing a laster beam through the transparent support and through the data storage holes of the optical disk or by reflecting a laser beam through the transparent support of the disk onto the surface layer. The data can also be stored in the form of surface deformations in which reflections from the deformations cause different readings.

For erasable optical memories such as optical disks, two types of structures exist for the inscription layer: non-erasable structures such as perforated metal layers, and erasable structures such as photographic structures, photoresists, and ablative thin films. Erasable structures use amorphous, metallic, or semiconducting materials, or magnetooptic, photochromic, photoferroelectric, thermoplastic, or photodichroic materials, or chalcogenide films. These materials change their optical properties after laser beam inscription. The general disadvantage of such erasable structures in the past has been a low signal-to-noise ratio, and the inability to erase individual bits of digital data. It is believed that until the present invention, an entire optical disk, an entire section of the disk, or a track of the disk had to be erased before rewriting could occur.

In one prior memory, a laser beam applies a heat pulse during a write operation to cause a highly expansible central layer to expand, raise, and disengage from a lower supporting surface, and to deform a layer of a relatively inexpansible marmem alloy superimposed on the central layer. The central layer then cools, lowers, and disengages from the marmem alloy protuberance. To erase the protuberance, a more powerful laser beam heat pulse changes the marmem alloy from its martensitic phase to a crystallographic phase, thus returning the marmem alloy to its original flat shape. The flat marmem alloy once again engages the highly expansible lower layer.

The continuing engagement-disengagement cycle between the upper and lower layers during write-erase operations eventually results in partial but permanent disengagement of the layers. Applicant believes the permanent disengagement prevents a deformation in the central layer from producing a protuberance of sufficient size in the upper marmen layer to give an acceptable signal-to-noise ratio when the optical reader reads the stored data.

The energy required to operate the laser for the writing and erasing operations is a function of the temperature and time length of the laser pulses. Typical writing temperatures have been around 1000° F., and erasing temperatures still higher. Thus, the high energy required to operate the later has greatly limited the use of this technology.

Thus, a need remains for erasable optical memories that retain an acceptable signal-to-noise ratio after repeated write-erase operations. A need also exists in such memories for the capability to erase in a practical manner single bits of data from the inscription data track.

SUMMARY OF THE INVENTION

The above-noted and other drawbacks of the prior art are met by providing a method and apparatus for erasing individual bits of stored digital data in a chalcogenide transformation film. The invention features the capability of physically stressing the transformation film to erase single bits of the stored digital data. A marmen alloy, on which the transformation film is deposited, stresses the film in response to a laser beam heat pulse. The undesirable signal-to-noise ratio and the great difficulty of erasing single bits of digital data, common to prior art devices, are virtually eliminated by the invention.

Delamination between the film and the alloy does not occur. Thus, repeated write-erase operations cause no delamination and therefore have little adverse effect on the signal-to-noise ratio. The invention is believed to provide the first erasable optical memory which can achieve an acceptable signal-to-noise ratio after repeated write-erase operations.

In one aspect of the invention, a single bit of digital data, occupying as little surface area on the film as 0.3 by 0.3 micron, may be erased. This exceeds the current optical reader capabilities of 0.6 by 0.6 micron. Typical recording areas are 0.6 by 0.6 micron, but the present invention achieves accuracy down to 0.3 by 0.3 micron. Selective erasing and editing of information stored on an optical disk is therefore now feasible. The invention is believed to be the first optical memory in which arbitrarily selected individual bits of digital data may be selectively erased, without having to erase an entire optical disk, or sector, or track of the disk, while maintaining disk integrity through a passive change in material properties.

In the practice of the present invention, greatly reduced laser temperatures may be used to write and erase. Since this greatly reduces the electrical power requirements for writing and erasing laser beams, the technology of laser beam writing and erasing may now be used in an increased number of applications. Furthermore, data stored using the present invention has at least a ten-year storage life. Also, the memory of the present invention is substantially immune to degradation when data is erased and rewritten repeatedly.

The above-noted and other objects and advantages of the present invention will become more apparent from a detailed description of a preferred embodiment when read in conjunction with the drawings.

BRIEF DESCRIPTION OF THE DRAWINGS

The invention will further be described by reference to the accompanying drawings wgich illustrate a preferred form of erasable optical memory embodying the present invention. In the drawings like members bear like reference numerals.

FIG. 3 is a cross-sectional view of the same segment or portion shown in FIG. 2, taken immediately after the segment or portion has been irradiated by a lower temperature laser beam pulse of longer duration, and FIG. 4 is a cross-sectional view of the same segment or portion shown in FIGS. 2 and 3 taken shortly after the segment or portion has been irradiated by the lower temperature laser beam.

DESCRIPTION OF A PREFERRED EMBODIMENT

Figure 1:
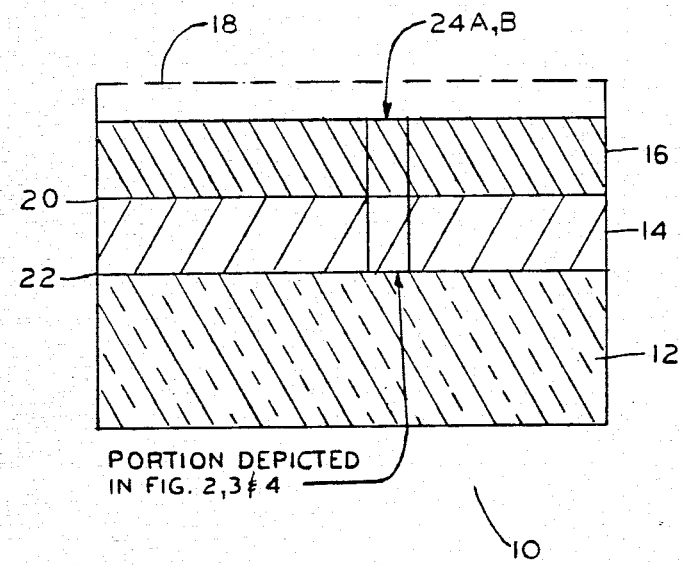
FIG. 1 is a sectional view on an erasable optical memory structure according to the invention.

Referring to the drawings, and in particular to FIG. 1, a section 10 of an erasable optical memory is depicted. The section 10 comprises a supporting platform 12, a layer of marmem (martensitic memory) alloy 14, a layer of chalcogenide transformation film 16, and an optional protection layer 18. The film 16 is deposited on the marmem alloy 14. An adhesive 22 tightly bonds the marmem alloy 14 to the supporting platform 12. Although there exist many chalcogenide transformation films, in the preferred embodiment samarium sulfide is used for the film 16. The preferred thickness of the film is about 1,000 angstroms. Other suitable films include films of the chalcogenide family of films, or any film whose different phases exhibit different light absorption and reflectivity.

Although many different martensitic memory alloys exist that may be used as the marmem alloy 14, in a preferred embodiment nickel-titanium, also known as nitinol, is the preferred material. The thickness of the marmem alloy 14 is not especially critical, but it can be made thicker or thinner to enhance heat transfer characteristics. However, the marmem alloy 14 preferably has a thickness in the range of about one ten-thousandths of an inch down to about one-half of one thousandth of an inch. Thus, the marmem alloy 14 is approximately 100 times thicker than the film 16 in the preferred embodiment.

The section 10 is depicted in FIG. 1 at ambient temperature, i.e., normally about 70° F. The composition of the marmem alloy 14 is chosen so that at ambient temperature it is in a martensitic phase, or state, 14a. The composition of the film 16 is chosen so that at ambient temperature it is in a low reflectivity phase, or state, 16a and is therefore less reflective than after a phase change.

Figure 2:
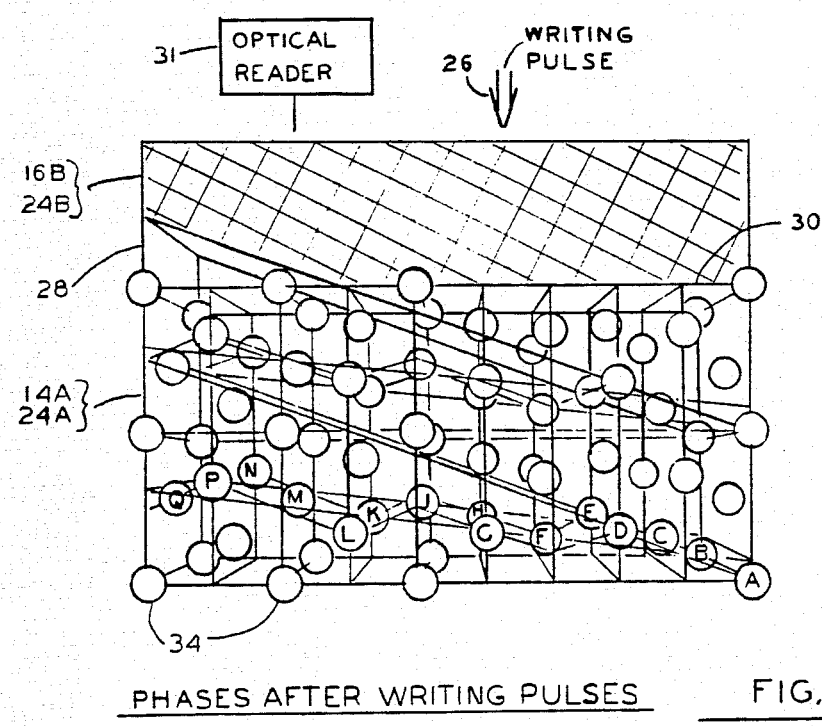
FIG. 2 is a cross-sectional view of an atomic scale of a small segment or portion of the transformation film and marmen layers of FIG. 1 at an ambient temperature after the portion has been irradiated by a high temperature laser beam pulse of short duration.

Referring now to FIG. 2, a cross-section of a microscopic memory portion 24a,b of section 10 is depicted after being irradiated by a short, high temperature laser beam heating pulse 26. Portion 24a is a portion of the marmen layer 14, and portion 24b is a portion of the film layer 16. The surface area of the portion 24b typically is as small as 0.6 by 0.6 micron. Substantially all of the film 16 may be partitioned into microscopic memory portions similar to portion 24b. Optical readers presently available typically read portions approximately 0.6 by 0.6 micrometer. However, the present invention allows portions as small as about 0.3 by about 0.3 micron to be written and selectively erased. While portions 24a,b are shown in FIGS. 2, 3 and 4 on an atomic scale, it is appreciated that the relative thicknesses of the marmem alloy 14 and the film 16 are not drawn to scale.

Impact of the laser pulse 26 on the portion 24b of film 16 causes this portion to be transformed from a low reflectivity phase 16a to a high reflectivity, or crystalline, phase, or state 16b. The temperature and duration of the beam are selected to effect this transformation but at the same time not cause any substantial change in the structure of the alloy layer 14. In that regard, the composition of the marmem alloy 14 is chosen so that it is not affected by the heating pulse 26, and thus remains in its martensitic phase 14a. In FIG. 2 it will be noted that the portion 14a of the alloy is shown to include a orthorhombic martensitic shift 28 in the range of perhaps three to nine angstroms above the surface 30 of the marmen alloy.

The crystalline phase, or state, 16b of the portion 24b of the film, at ambient temperature after cooling from the effect of the writing pulse, exhibits a more reflective state. Thus, a light striking the portion 24b in its crystalline phase 16b is reflected to register a digital bit of data, e.g., a logic "1" with an optical reader 31. Thus, the heating pulse 26 is a writing pulse that writes a digital data bit onto the portion 24b of the film. The portion 24b remains in its crystalline phase indefinitely, as long as no thermal or physical stresses are applied to the portion 24b.

In the preferred and illustrated embodiment, a laser pulse 26 of about one hundred nanoseconds duration and having an energy level of about 15–20 milliwatts is sufficient for writing on the film without affecting the marmen alloy 16.

Referring now to FIG. 3, there is depicted the same portion 24a,b of section 10 of the erasable optical memory immediately after that portion 24 has been irradiated by a longer, lower energy level pulse 32 from a laser beam. The duration and energy level of the pulse 32 are selected to transform the marmen alloy portion 24a to its crystallographic phase, or state, without adversely affecting the film 16. In the preferred and illustrated embodiment, the pulse 32 has a duration of about one hundred microseconds, and an energy level of about 1–2 milliwatts. The laser beam pulse 32, for example, causes the atoms 34 of the alloy portion 24a to move from an orthorhombic structure in the martensitic phase 14a to a $B_2$ superlattice structure in the crystallographic phase 14b. This movement of the atoms 34 from one atomic structure to another atomic structure reduces or eliminates the shift 28.

This reduction of, for example, only three to nine angstroms is not sufficient to cause physical deformation of the portion 24b of the film, but is enough movement to stress the film sufficiently to cause the portion 24b of the film to change from the tight crystalline phase 16b to the less reflective phase 16a. The film 16 in its less reflective phase 16a reflects light with less intensity. The optical reader 31, sensing the light reflecting off of the less reflective phase film 16a of the portion 24b, interprets that lesser reflection as representing a logic "0" of digital data. Thus, the heating pulse 32 is an erasing pulse that erases the digital data bit from the portion 24b of the film.

Referring now to FIG. 4, the marmem alloy portion 24a substantially immediately cools and returns to its martensitic phase 14a, again stressing the portion 24b of the film. However, since the digital bit of data has now been erased from portion 24b, the stress causes no further change in the portion 24b of the film.

The composition of the marmem alloy and the composition of the chalcogenide transformation film are coordinated to achieve the write-erase operation described above. The film has a transition temperature from a less reflective phase to a crystalline phase which is substantially above the transition temperature of the marmem alloy from its martensitic phase to its crystallographic phase. The film may be doped to obtain this differential in transition temperatures. The differential is sufficient so that erasing digital data by irradiating the marmem alloy with a laser beam heating pulse occurs at a temperature significantly below writing digital data by irradiating the film with a laser beam. Otherwise, the erasing operation by heating the marmem could undesirably heat the film to cause writing to occur. Also, the writing operation on the film could undesirably heat the marmem alloy close to its transition temperature, causing it to stress the film and immediately erase what had been written.

Although many combinations of films and alloys are within the scope of this invention, it is desirable to use the lowest possible temperature of a laser beam heat pulse, thus reducing power requirements. In a preferred embodiment, the film 16 has a transition temperature of about 400° F., and transforms from a less reflective phase to a crystalline phase in response to irradiation with a laser writing pulse 26 of about 15–20 milliwatts, lasting about one hundred nanoseconds. The marmem alloy 14 preferably has a transition temperature of about 150° F. and transforms from a martensitic phase 14a to a crystallographic phase 14b in response to irradiation by a laser erasing pulse 32 of about 1–2 milliwatts, lasting about 100 microseconds.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. An erasable optical memory adapted for writing and erasing data bits, in response to heating pulses, comprising:
    a transformation film having selected portions capable of being transformed from a low reflectivity to a higher reflectivity phase in response to a first heating pulse for storing digital bits of data as indicated by said phases, each high reflectivity phase portion being responsive to sufficient physical stress on one side to change from said higher reflectivity phase to said low reflectivity phase; and
    a marmen alloy secured on a first side to said one side of said film, said marmen alloy being responsive to a second heating pulse at a selected portion to transform itself from a martensitic state to a crystallographic state, and to generate, only when it so transforms, said sufficient physical stress on said one side of said transformation film at said selected portion only, whereby the transformation film is not subjected to a constant mechanical stress from a source external to the memory in order to change reflectivity phases, and wherein a portion of the transformation film having one state is characterized as storing one logic state and when having another state is characterized as storing another logic state,
wherein the generation of said sufficient physical stress by the marmen alloy occurs with a concurrent physical deformation of the marmen alloy sufficiently small such that after application of the first and second heating pulses the transformation film remains substantially physically undeformed, and remains substantially laminated with the marmen alloy.

2. The apparatus according to claim 1 wherein said marmem alloy is nickel-titanium, and said transformation film is samarium sulfide.

3. The apparatus according to claim 2 wherein said alloy is secured on a second side to a supporting platform.

4. The apparatus according to claim 2 wherein said marmem alloy has a thickness within the range between about one ten-thousandths of an inch and about one-half of one-thousandth of an inch, and said transformation film has a thickness of approximately 1,000 angstroms.

5. The apparatus according to claim 2 wherein each said portion is smaller than about 0.6 by about 0.6 micrometer.

6. The apparatus according to claim 1 wherein a protection layer is bonded to a top side of said film.

7. The erasable optical memory according to claim 1 wherein:
    (a) the first heating pulse has a value between fifteen and twenty milliwatts, the first heating pulse lasting less than about 100 nanoseconds, and the marmen alloy is not operatively affected by and is not responsive to the first heating pulse; and
    (b) the second heating pulse has a value between one and two milliwatts, the second heating pulse lasting less than about 100 microseconds, and the transformation film is not operatively affected by and is not responsive to the second heating pulse.

8. The erasable optical memory of claim 7 wherein the first heating pulse is a laser beam heating pulse.

9. The erasable optical memory of claim 7 wherein the second heating pulse is a laser beam heating pulse.

10. The erasable optical memory of claim 1 wherein the first heating pulse is a laser beam heating pulse.

11. The erasable optical memory of claim 1 wherein the second heating pulse is a laser beam heating pulse.

12. The memory according to claim 1 wherein the transformation film and the marmen alloy withstand repetition of the first and second heating pulses while remaining substantially laminated together.

13. The memory of claim 12 wherein said heating pulses are laser beam heating pulses.

14. The erasable optical memory according to claim 13 wherein:
    (a) the first heating pulse has a value between fifteen and twenty milliwatts, the first heating pulse lasting less than about 100 nanoseconds, and the marmen alloy is not operatively affected by and is not responsive to the first heating pulse; and
    (b) the second heating pulse has a value between one and two milliwatts, the second heating pulse lasting less than about 100 microseconds, and the transformation film is not operatively affected by and is not responsive to the second heating pulse.

15. The erasable optical memory according to claim 1 wherein the marmen alloy has an orthorhombic structure in the martensitic state, and has a superlattice structure in the crystallographic state.

16. A method of storing information in an erasable optical memory responsive to laser beam heating pulses, and erasing individually selected bits of said data, comprising the steps of:
  (a) securing a chalcogenide transformation film to a marmen alloy;
  (b) partitioning said film into a plurality of memory portions;
  (c) irradiating one or more portions of said chalcogenide film with a first of said heating pulses, thereby to store data; and
  (d) selectively irradiating one or more but less than all of said portions with a second heating pulse of longer duration and lower temperature, the marmen alloy stressing said one or more but less than all of said portions in response to said selectively irradiating, thereby to erase data,
wherein after irradiating the portions with the heating pulses, the transformation film remains substantially physically undeformed, and remains substantially laminated with the marmen alloy.

17. The method according to claim 16 wherein as the first and second heating pulses are repeated, the transformation film and the marmen alloy remain substantially laminated together.

18. The method of claim 17 wherein the temperature of both the first and second layers are elevated by means of a laser beam heating pulse.

19. A multilayer optical memory comprising:
  a first layer which is readable, writable, and erasable, the first layer comprising a chalcogenide transformation film layer capable of being transformed from a low reflectivity phase to a crystalline phase at portions along a first surface where its temperature is elevated above a first temperature, and being further capable of transformation from said crystalline phase to said low reflectivity phase at portions along said first surface where it is stressed; and
  a second layer of a marmen alloy capable of being stressed at portions along a first surface by transformation from a martensitic phase to a crystallographic phase only where its temperature is elevated above a second temperature less than said first temperature, the first surface of said second layer being secured to a second surface of said first layer such that said stressing at said portions along said first surface of said second layer is transmitted to adjacent portions in said first layer, whereby the first layer is not subjected to a constant mechanical stress from a source external to the memory to change from said crystalline phase to said low reflectivity phase, and
wherein said transformation of the marmen alloy is sufficiently small such that the transformation film layer remains substantially physically undeformed and remains substantially laminated to the marmen alloy layer when said stressing occurs.

20. The memory of claim 19 wherein the transformation film and the marmen alloy withstand repeated stressing of the portions of the first surface of the marmen alloy while remaining substantially laminated together.

21. The erasable optical memory according to claim 19 wherein the marmen alloy has an orthorhombic structure in the martensitic phase and has a superlattice structure in the crystallographic phase.

22. A method for recording information which comprises:
  a. generating laser beam pulses at a first energy level to reflect binary bits of two different values;
  b. directing said beam pulses at a multilayer record medium comprising a layer of a chalcogenide transformation material deposited on a layer of a marmen alloy;
  c. selecting said first energy level to be sufficient to transform said transformation material from a low reflectivity phase to a higher reflectivity phase and said alloy from a martensitic phase to a crystallographic phase, but limiting the duration of said pulses at said first energy level to transform said transformation material from said low reflectivity phase to said higher reflectivity phase without transforming said alloy from said martensitic phase to said crystallographic phase.

23. The method of claim 22 further comprising a method of erasing information recorded on said film by generating laser beam pulses at a second energy level insufficient to transform said transformation material from said low reflectivity phase to said higher reflectivity phase but sufficient to transform said alloy from said martensitic phase to said crystallographic phase.

24. The method of claim 22 or 23 in which said transformation material comprises samarium sulfide and said marmen alloy comprises a nickel-titanium alloy.

* * * * *

UNITED STATES PATENT AND TRADEMARK OFFICE
CERTIFICATE OF CORRECTION

PATENT NO. : 4,774,702
DATED : September 27, 1988
INVENTOR(S) : Jeffrey A. Giacomel It is certified that error appears in the above-identified patent and that said Letters Patent is hereby corrected as shown below:

```
In the Title, replace "MARMEN" with --MARMEM--.

In Column 1, line 3, replace "MARMEN" with --MARMEM--.
             line 68, replace "marmen" with --marmem--.

In Column 2, line 8, replace "later" with --laser--.
             line 23, replace "marmen" with --marmem--.
             line 67, replace "wgich" with --which--.

In Column 3, line 7, replace "marmen" with --marmem--.
             line 59, replace "marmen" with --marmem--.

In Column 4, line 13, replace "include a orthorhombic" with
             -- include an orthorhombic--.
             line 16, replace "marmen" with --marmem--.
             line 32, replace "marmen" with --marmem--.
             line 38, replace "marmen" with --marmem--.

In Column 5, line 41, replace "spririt" with --spirit--.
             line 54, replace "marmen" with --marmem--.
             line 55, replace "marmen" with --marmem--.

In Column 6, line 2, replace "marmen" with --marmem--.
             line 3, replace "marmen" with --marmem--.
             line 7, replace "marmen" with --marmem--.
             line 29, replace "marmen" with --marmem--.
             line 45, replace "marmen" with --marmem--.
             line 56, replace "marmen" with --marmem--.
             line 64, replace "marmen" with --marmem--.
```

UNITED STATES PATENT AND TRADEMARK OFFICE
CERTIFICATE OF CORRECTION

PATENT NO. : 4,774,702
DATED : September 27, 1988
INVENTOR(S) : Jeffrey A. Giacomel It is certified that error appears in the above-identified patent and that said Letters Patent is hereby corrected as shown below:

In Column 7, line 4, replace "marmen" with --marmem--.
             line 13, replace "marmen" with --marmem--.
             line 19, replace "marmen" with --marmem--.
             line 22, replace "marmen" with --marmem--.
             line 37, replace "marmen" with --marmem--.

In Column 8, line 4, replace "marmen" with --marmem--.
             line 7, replace "marmen" with --marmem--.
             line 10, replace "marmen" with --marmem--.
             line 12, replace "marmen" with --marmem--.
             line 15, replace "marmen" with --marmem--.
             line 25, replace "marmen" with --marmem--.
             line 46, replace "marmen" with --marmem--.

Signed and Sealed this

Twenty-third Day of May, 1989

Attest:

DONALD J. QUIGG

Attesting Officer      Commissioner of Patents and Trademarks